Figure 1:
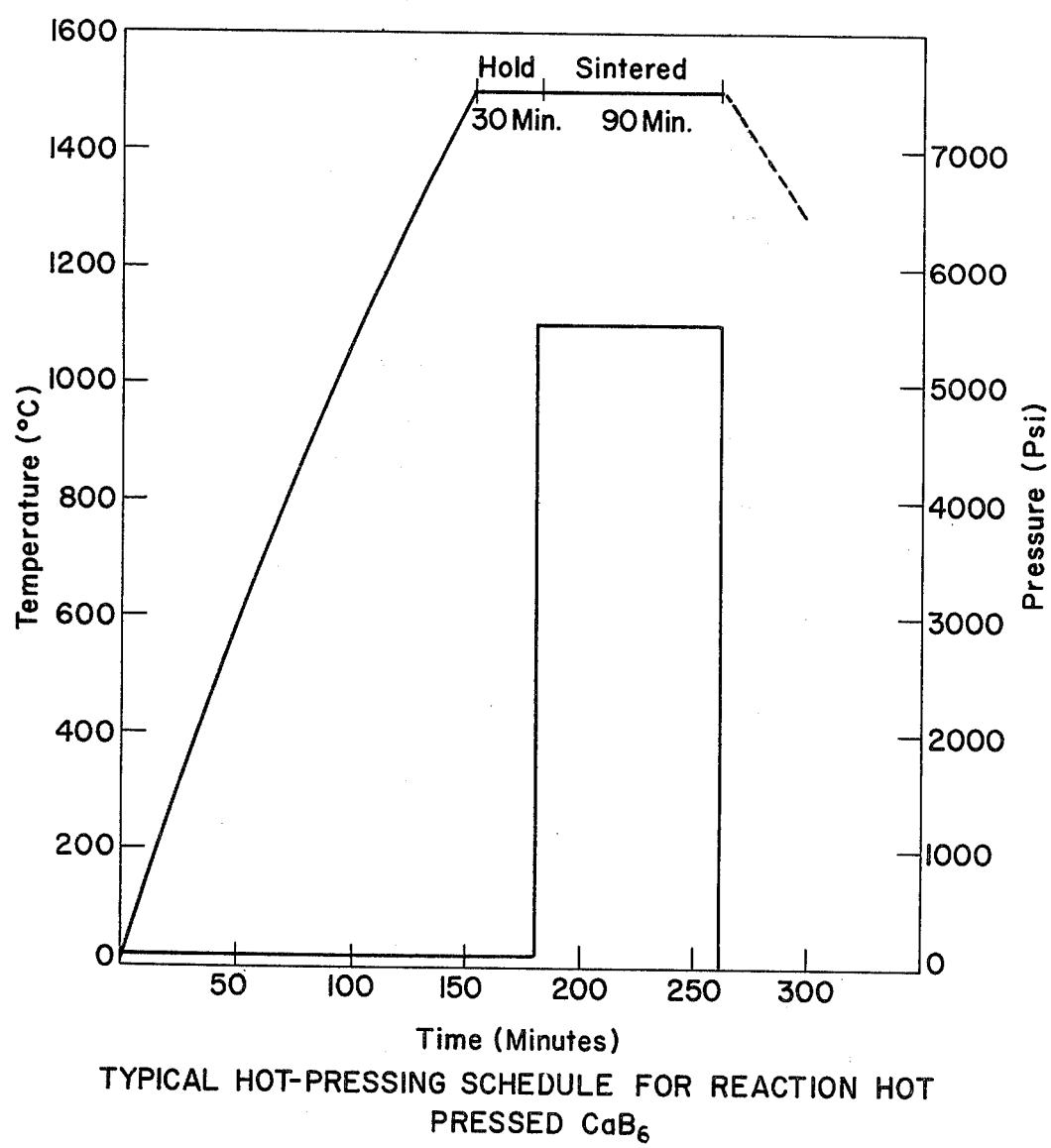

United States Patent

Dutta

[11] 4,017,577
[45] Apr. 12, 1977

[54] HOT PRESSING OF REACTION SINTERED $CaB_6$

[75] Inventor: Sunil K. Dutta, West Newton, Mass.

[73] Assignee: The United States of America as represented by the Secretary of the Army, Washington, D.C.

[22] Filed: Feb. 15, 1974

[21] Appl. No.: 443,069

[52] U.S. Cl. ............................ 264/102; 75/226; 106/63; 264/65; 264/332
[51] Int. Cl.² ........................................ C04B 35/58
[58] Field of Search ............ 264/65, 66, 332, 102; 106/63

[56] References Cited

UNITED STATES PATENTS 3,379,647  4/1968  Smudski ............................ 264/65
3,702,881  11/1972  DasChaklader ................... 264/66

OTHER PUBLICATIONS

Schwarzkopf et al., Refractory Hard Metals, pp. 272–273 (1953).
High Temperature Technology, Ed. by Campbell, pp. 131–150 (1956).

Primary Examiner—Robert F. White
Assistant Examiner—John Parrish
Attorney, Agent, or Firm—Nathan Edelberg

[57] ABSTRACT

A method for the production of high density compacts of calcium hexaboride comprising the gradual heating of stoichiometric quantities of calcium oxide and boron powder to a temperature of approximately 1500° C and maintaining that temperature for a period of about 30 minutes to produce calcium hexaboride, applying a pressure of about 5500 psi, and maintaining both temperatures and pressures for about 90 minutes.

1 Claim, 2 Drawing Figures

TYPICAL HOT-PRESSING SCHEDULE FOR REACTION HOT PRESSED $CaB_6$

TYPICAL HOT-PRESSING SCHEDULE FOR REACTION HOT PRESSED $CaB_6$

HOT PRESSING OF REACTION SINTERED CaB₆

BACKGROUND OF THE INVENTION

Earlier work has shown that calcium hexaboride can be subjected to temperatures and pressures to produce a sintered product. This product required temperatures around 1,600° C and above if it was to achieve a density that approached the theoretical density for calcium hexaboride. It is desirable for certain purposes to produce the material with a density that is as high as possible. it is also desirable to produce this high density material at temperatures that are as low as possible. This latter aspect is primarily one of economics in that lower operating temperatures prolong the life of the vacuum hot-press equipment employed in the process as well as avoiding the necessity for constructing equipment having exceptional structural and insulating qualities. The sintered calcium hexaboride has utility as the principal ingredient of personnel armor and similar equipment that is designed to protect from shrapnel and similar fragmentary missiles.

The present invention, which has been designated, "reaction-hot-pressing," relates to a method for the fabrication of high density calcium hexaboride at temperatures below those of the prior art. The reaction-hot-pressing process comprises an in situ reaction of calcium oxide and amorphous boron to form the boride while simultaneously applying heat and pressure to the reaction to cause the sintering of the product as it is produced.

It is an object of the present invention to provide and disclose an improved method for the production of high density $CaB_6$.

It is a further object of the present invention to provide and disclose an improved method for the production of high density $CaB_6$ utilizing calcium oxide and amorphous boron as the starting ingredients.

It is a further object of the present invention to provide and disclose an improved method for the production of high density $CaB_6$ from calcium oxide and amorphous boron utilizing subconventional hot pressing temperatures.

These and other objects will be readily ascertained from the following description of the invention and the claims taken in conjunction with the accompanying drawings in which FIG. 1 is a graphic representation of the temperature-pressure-time cycle (process parameters) involved in the production of the reaction-hot-pressed $CaB_6$.

Figure 2:
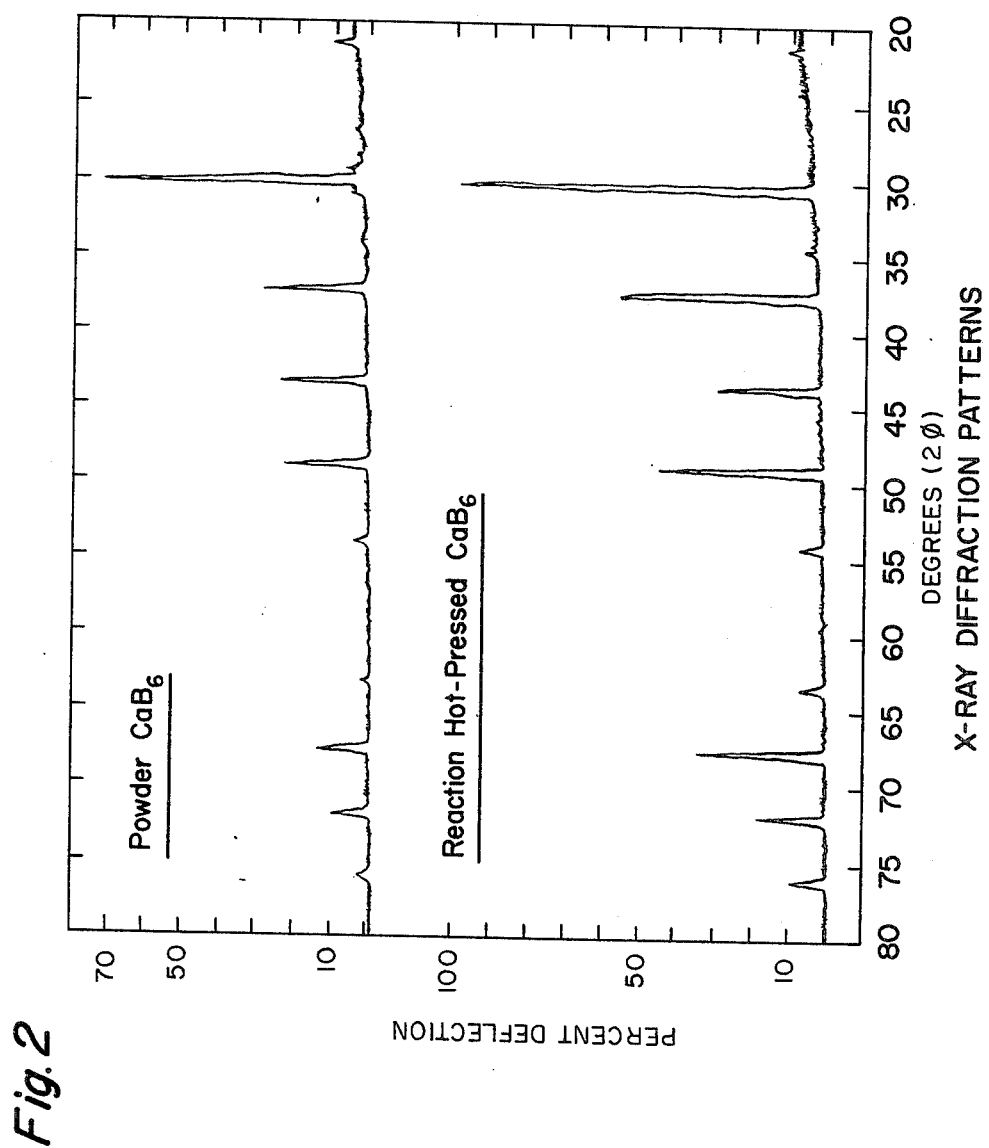

FIG. 2 is a graphic representation of comparative X-ray diffraction patterns of the in situ reaction-hot-pressed $CaB_6$ and the product resulting from hot pressing preproduced $CaB_6$.

In previous work undertaken by applicant, the sintering of calcium hexaboride was studied starting with powdered calcium hexaboride that had a particle size of −325 mesh. The aim was to fabricate a product that approached the theoretical density of $CaB_6$ which is approximately 2.45g/cubic centimeter. In performing this work, the powdered $CaB_6$ was subjected to temperatures of approximately 1600° C and to pressures of 6000 lbs per square inch for a period of from 1 to 3 hours. This work forms the basis of applicant's copending application Ser. No. 298,099 filed 16 Oct. 1972. While this process was successful in producing a dense product having utility in the field of armor protection, a study was continuing to achieve a similar product using lower temperatures and eliminating the raw material synthesis step.

In an attempt to expose finer particles of calcium boride to sintering conditions, applicant has developed a method in which the reaction ingredients required to produce the $CaB_6$ are fed into the sintering chamber and heated for a period of time and thereafter subjected to pressure. In carrying through this process, applicant has found that he can simultaneously synthesize and produce a sintered $CaB_6$ (compound) that has a density which is closer to its theoretical density at lower temperatures than were heretofore possible. The exact reason for this phenomenon is that reaction sintering occurs when a chemical reaction takes place between the two components (calcium oxide and amorphous boron) during sintering and the sintering process is enhanced thereby. An ultimate goal of reaction sintering is to simultaneously react and sinter the elemental ingredients in the proper proportions. Sintering is enhanced by the in situ formation of the desired reaction product at rates that may be significantly faster than self-diffusion in the final compound. An additional aid to the process is the release of heat of formation of the product.

In a specific example of the reaction-hot-pressing process, 4.6 grams of commercially available calcium oxide having an average particle size of 2.2 microns and 5.4 grams of commercially available amorphous boron having a particle size of less than 1 micron were mixed together in stoichimetrical proportions in an alumina ball mill for a period of 12 hours. The mixed powders were loaded into a Grafoil-lined graphite die 1″ in diameter and placed in a vacuum hot-press chamber. Grafoil spacers were used to separate the powders from the graphite plungers and the use of Grafoil liners and spacers minimized a die reaction and carbon diffusion during sintering. After preliminary evacuation, the temperature was raised at a rate of 8°–10° C per minute to about 1,500° C. The temperature was maintained at this level for a period of about 30 minutes while the reaction proceeded toward the production of calcium hexaboride. After the 30 minute period, a uniaxial pressure of about 5,500 pounds per square inch was applied to the compact and the sintering proceeded for a period of about 90 minutes. The pressure was then released and the compact allowed to slowly cool in the die to prevent thermal cracking. The process is graphically represented in FIG. 1 in which the abscissa represents the reaction time while the temperature and pressure relationships are expressed on the ordinate portion of the graph. The temperature curve represents a linear biased relationship for 150 minutes followed by a constant temperature for about 120 minutes and subsequent drop in temperature during cooling. The pressure curve reflects an atmospheric pressure condition for 180 minutes of the temperature cycle followed by an instantaneously applied pressure of 5,500 psi which is maintained for the last 90 minutes of the temperature cycle. It then immediately returns to atmospheric pressure.

The recovered compact had a density of 2.45 grams per cubic centimeter; a hardness of 2,700 kilograms per mm²; and a melting temperature of 2,235° C. The density of the compact produced by the reaction-hot-pressed method was compared with that of a compact produced at the same temperature by the standard-hot-pressed method which compared favorably. In addition, a comparative study was made of the density percents that resulted from heatings below the 1,500° C level. These results are set out in Table 1. The pressure employed was about 5,500 psi and the time cycle was about two hours after reaching temperature level.

FIG. 2 indicates the phase identifications with the peak magnitudes being reflective of the degree of formation of pure single phase calcium hexaboride compound by reaction-hot-pressing technique. The comparative heights of adjacent peaks indicate the greater degree of high density single phase ($CaB_6$) and better orientation of the perfect crystals. The results suggest that both the synthesis and fabrication of high final density bodies of $CaB_6$ is possible by the reaction-hot-pressing technique thus making the processes more cost effective.

TABLE 1

COMPARATIVE DENSITY DATA FOR SINTERED $CaB_6$
BY STANDARD AND REACTION METHODS

| TEMPERATURE DEGREES C | RELATIVE DENSITY (PERCENT OF TOTAL) | |
|---|---|---|
| | STANDARD-HOT-PRESSING | REACTION-HOT-PRESSING |
| 1000 | 70–75 | 85–90 |
| 1200 | 80–84 | 94–96 |
| 1400 | 88–90 | 96–98 |
| 1500 | 94–95 | 99–100 |

The method has application to other lightweight high boron compounds that find usefulness in armor protective equipment. For example, silicon dioxide and aluminum oxide can be reacted with amorphous boron and sintered in situ to produce a high density $SiB_6$ or $AlB_{12}$. The most outstanding advantages accruing from the practice of the present invention is that the boride can be simultaneously formed and hot pressed to theoretical density at subconventional temperatures. This use of lower temperatures contributes to a significant overall cost saving by:

a. Reduction of total cooling time cycle.
b. Less power consumption.
c. Increased die and mold life.
d. Reduced scrap rate.
e. Better process control.

Having described my invention, I claim:

1. A method for the production of high density compact of calcium hexaboride comprising the steps of:
   after preliminary evacuation, gradually heating stoichiometric quantities of calcium oxide having an average particle size of 2.2 microns and boron powder having a particle size of less than 1 micron at a rate of approximately 8°–10° C per minute to a temperature of approximately 1,500° C.
   maintaining the calcium oxide and boron powder at the above temperature for approximately 30 minutes to cause their reaction to produce calcium hexaboride;
   applying a pressure of approximately 5,500 pounds per square inch to the produced calcium hexaboride;
   maintaining the produced calcium hexaboride at 1,500° C and 5,500 psi for approximately 90 minutes to produce a sintered compact and
   returning the pressure to atmospheric conditions while allowing the sintered compact to gradually cool to ambient temperatures.

* * * * *